United States Patent
Kim et al.

(10) Patent No.: US 10,654,248 B2
(45) Date of Patent: *May 19, 2020

(54) CONDUCTIVE STRUCTURE AND ELECTRONIC DEVICE COMPRISING SAME

(71) Applicant: LG CHEM, LTD., Seoul (KR)

(72) Inventors: Sujin Kim, Daejeon (KR); Yong Chan Kim, Daejeon (KR); Ki-Hwan Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 179 days.

This patent is subject to a terminal disclaimer.

(21) Appl. No.: 15/555,364

(22) PCT Filed: Mar. 16, 2016

(86) PCT No.: PCT/KR2016/002670
§ 371 (c)(1),
(2) Date: Sep. 1, 2017

(87) PCT Pub. No.: WO2016/148515
PCT Pub. Date: Sep. 22, 2016

(65) Prior Publication Data
US 2018/0037003 A1    Feb. 8, 2018

(30) Foreign Application Priority Data
Mar. 16, 2015 (KR) .................. 10-2015-0036104

(51) Int. Cl.
*B32B 15/04* (2006.01)
*H01B 1/08* (2006.01)
*H01B 5/14* (2006.01)

(52) U.S. Cl.
CPC .............. *B32B 15/04* (2013.01); *H01B 1/08* (2013.01); *H01B 5/14* (2013.01);
(Continued)

(58) Field of Classification Search
CPC ... B32B 15/04; B32B 15/2309; B32B 15/105; B32B 2307/418; B32B 2307/202; B32B 2307/412; H01B 1/08; H01B 5/014
See application file for complete search history.

(56) References Cited

U.S. PATENT DOCUMENTS

| 6,838,166 B2 | 1/2005 | Phillips et al. |
| 7,037,862 B2 | 5/2006 | Ahn et al. |

(Continued)

FOREIGN PATENT DOCUMENTS

| JP | 2004139780 A | 5/2001 |
| JP | 2008028249 A | 2/2008 |

(Continued)

OTHER PUBLICATIONS

Ortega, A., E.J. Rubio, K. Abhilash, C.V. Ramana. "Correlation between phase and optical properties of yttrium-doped hafnium oxide nanocrystalline thin films." Optical Materials. 35 (2013) 1728-1734. http://dx.doi.org/10.1016/j.otmat.2013.05.017 (Year: 2013).*

(Continued)

*Primary Examiner* — Nancy R Johnson
(74) *Attorney, Agent, or Firm* — Dentons US LLP

(57) ABSTRACT

The present invention provides a conductive structure and an electronic device comprising same. The conductive structure comprises a first hafnium oxide layer, a metal layer, a second hafnium oxide layer and satisfies mathematical formula 1.

14 Claims, 1 Drawing Sheet

```
┌─────────────────────┐
│                     │
│        301          │
│                     │
├─────────────────────┤
│                     │
│        201          │
│                     │
├─────────────────────┤
│                     │
│        101          │
│                     │
└─────────────────────┘
```

(52) U.S. Cl.
CPC ... *B32B 2307/202* (2013.01); *B32B 2307/412* (2013.01); *B32B 2307/418* (2013.01); *B32B 2309/105* (2013.01)

(56) References Cited

U.S. PATENT DOCUMENTS

| | | | |
|---|---|---|---|
| 8,093,800 | B2 | 1/2012 | Inoue et al. |
| 2006/0003602 | A1* | 1/2006 | Yu ................. C23C 14/0026 438/787 |
| 2008/0017954 | A1 | 1/2008 | Suzuki et al. |
| 2011/0174361 | A1 | 7/2011 | Bang et al. |

FOREIGN PATENT DOCUMENTS

| | | |
|---|---|---|
| JP | 2011158753 A | 8/2011 |
| KR | 100915147 B1 | 8/2009 |
| KR | 1020100036957 A | 4/2010 |
| KR | 1020120086210 A | 8/2012 |

OTHER PUBLICATIONS

Werner et al. "Atomic layer deposition of Ti-HfO2 dielectrics." Journal of Vacuum Science & Technology A 31, 01A102 (2013). Published online Aug. 24, 2012. https://doi.org/10.1116/1.4748570 (Year: 2012).*

D. L. Wood, Kurt Nassau, T. Y. Kometani, and D. L. Nash, "Optical properties of cubic hafnia stabilized with yttria," Appl. Opt. 29, 604-607 (1990) (Year: 1990).*

King, Peter James. "Hafnium oxide-based dielectrics by atomic layer deposition." University of Liverpool; https://livrepository.liverpool.ac.uk/9253/1/KingPet_Jan2013_9253.pdf. Jan. 2013 (Year: 2013).*

Al-Kuhaili: "Optical properties of hafnium oxide thin films and their application in energy-efficient windows", XP-029186678, Optical Materials, Elsevier, vol. 27, No. 3, Oct. 21, 2004, pp. 383-387.

* cited by examiner

【FIG. 1】
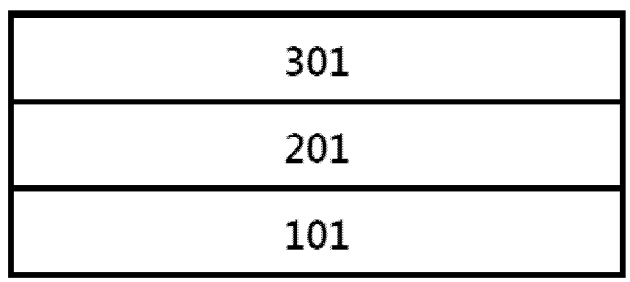
【FIG. 2】
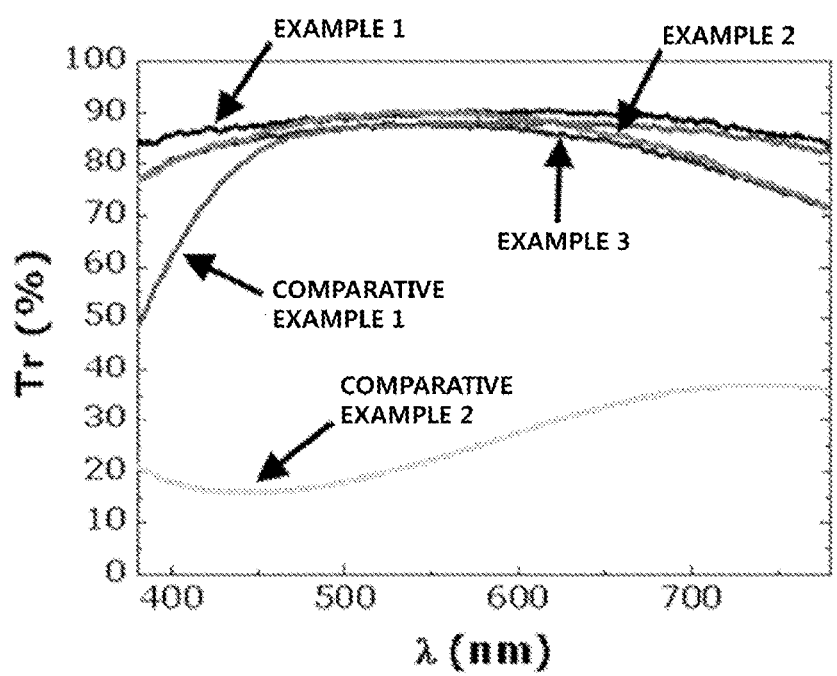

CONDUCTIVE STRUCTURE AND ELECTRONIC DEVICE COMPRISING SAME

TECHNICAL FIELD

This application is a National Stage Application of International Application No. PCT/KR2016/002670, filed Mar. 16, 2016, and claims the benefit of Korean Patent Application No. 10-2015-0036104, filed Mar. 16, 2015, contents of which are incorporated herein by reference in their entirety for all purposes as if fully set forth below.

The present specification relates to a conductive structure and an electronic device including the same.

BACKGROUND ART

As new and renewable energy industry rapidly rises together with cutting-edge information technology industry, interests in conductive structure bodies having both electrical conductivity and light transmittance are growing. A conductive structure in an organic electronic device is a thin transparent substrate, and needs to have excellent electrical conductivity while transmitting light.

Transparent conducting oxides (TCO) prepared in a thin film form are most common as a material of a conductive structure. A transparent conducting oxide is a term collectively referring to an oxide-based degenerated semiconductor electrode having both high optical transmittance (85% or greater) and low specific resistance ($1 \times 10^{-3}$ $\Omega$cm) in a visible region, and has been used as a functional thin film such as an antistatic film and an electromagnetic wave shielding film, and a core electrode material of flat displays, solar cells, touch panels, transparent transistors, flexible photoelectric devices, transparent photoelectric devices and the like depending on the magnitude of sheet resistance.

However, conductive structure manufactured employing transparent conducting oxides as a material have low electrical conductivity and thereby have a problem of reducing device efficiency.

DISCLOSURE

Technical Problem

The present specification is directed to providing a conductive structure and an electronic device including the same.

Technical Solution

One embodiment of the present specification provides a conductive structure including a first hafnium oxide layer including a hafnium oxide; a metal layer provided on the first hafnium oxide layer; and a second hafnium oxide layer including a hafnium oxide provided on the metal layer, wherein the following Mathematical Formula 1 is satisfied.

$$\frac{0.12}{D_{eff}} + \left(1 - 0.06^{k_{eff\_dielectric}}\right) + \left(1 - 0.98^{(d \cdot k_{eff\_metal})}\right) \leq 0.25 \quad \text{[Mathematical Formula 1]}$$

$$D_{eff} = \frac{n_{eff\_550} - 1}{n_{eff\_380} - n_{eff\_450}} \quad \text{[Mathematical Formula 2]}$$

$$n^2_{eff\_dielectric} = \frac{1}{2}\{(n_1^2 - k_1^2)f_1 + (n_2^2 - k_2^2)f_2\} \times \left(1 + \left\{1 + \left[\frac{2(n_1 k_1 f_1 + n_2 k_2 f_2)}{(n_1^2 - k_1^2)f_1 + (n_2^2 - k_2^2)f_2}\right]^2\right\}^{1/2}\right) \quad \text{[Mathematical Formula 3]}$$

$$k_{eff\_dielectric} = \frac{1}{n_{eff\_dielectric}}(n_1 k_1 f_1 + n_2 k_2 f_2) \quad \text{[Mathematical Formula 4]}$$

$$n^2_{eff\_metal} = \frac{1}{2}\{(n_3^2 - k_3^2)f_3 + (n_4^2 - k_4^2)f_4\} \times \left(1 + \left\{1 + \left[\frac{2(n_3 k_3 f_3 + n_4 k_4 f_4)}{(n_3^2 - k_3^2)f_3 + (n_4^2 - k_4^2)f_4}\right]^2\right\}^{1/2}\right) \quad \text{[Mathematical Formula 5]}$$

$$k_{eff\_metal} = \frac{1}{n_{eff\_metal}}(n_3 k_3 f_3 + n_4 k_4 f_4) \quad \text{[Mathematical Formula 6]}$$

In Mathematical Formula 1, $D_{eff}$ is a degree of dispersion of a mean refractive index of the first hafnium oxide layer and the second hafnium oxide layer calculated by Mathematical Formulae 2 and 3, $k_{eff\_dielectric}$ is a mean extinction coefficient of the first hafnium oxide layer and the second hafnium oxide layer calculated by Mathematical Formula 4, d is a total thickness of the first hafnium oxide layer, the second hafnium oxide layer and the metal layer, and $k_{eff\_metal}$ is a mean extinction coefficient of the first hafnium oxide layer, the second hafnium oxide layer and the metal layer calculated by Mathematical Formula 5, in Mathematical Formula 2, $n_{eff\_550}$ is a mean refractive index of the first hafnium oxide layer and the second hafnium oxide layer calculated by Mathematical Formula 3 in light with a wavelength of 550 nm, $n_{eff\_450}$ is a mean refractive index of the first hafnium oxide layer and the second hafnium oxide layer calculated by Mathematical Formula 3 in light with a wavelength of 450 nm, and $n_{eff\_380}$ is a mean refractive index of the first hafnium oxide layer and the second hafnium oxide layer calculated by Mathematical Formula 3 in light with a wavelength of 380 nm, in Mathematical Formulae 3 and 4, $n_1$ is a refractive index of the first hafnium oxide layer, $n_2$ is a refractive index of the second hafnium oxide layer, $k_1$ is an extinction coefficient of the first hafnium oxide layer, $k_2$ is an extinction coefficient of the second hafnium oxide layer, $f_1$ is a thickness ratio of the first hafnium oxide layer with respect to the first hafnium oxide layer and the second hafnium oxide layer, and $f_2$ is a thickness ratio of the second hafnium oxide layer with respect to the first hafnium oxide layer and the second hafnium oxide layer, in Mathematical Formulae 5 and 6, $n_3$ is a mean refractive index ($n_{eff\_dielectric}$) of the first hafnium oxide layer and the second hafnium oxide layer, $n_4$ is a refractive index of the metal layer, $k_3$ is a mean extinction coefficient ($k_{eff\_dielectric}$) of the first hafnium oxide layer and the second hafnium oxide layer, $k_4$ is an extinction coefficient of the metal layer, $f_3$ is a thickness ratio of the first hafnium oxide layer and the second hafnium oxide layer with respect to the conductive structure, and $f_4$ is a thickness ratio of the metal layer with respect to the conductive structure, and the mean extinction coefficient ($k_{eff\_dielectric}$) of the first hafnium oxide layer and the second hafnium oxide layer, and the mean extinction coefficient ($k_{eff\_metal}$) of the first hafnium oxide layer, the second hafnium oxide layer and the metal layer are values each measured in light with a wavelength of 380 nm.

Another embodiment of the present specification provides a transparent electrode including the conductive structure.

Still another embodiment of the present specification provides an electronic device including the conductive structure.

Advantageous Effects

A conductive structure according to one embodiment of the present specification has high light transmittance and low sheet resistance values. In addition, the conductive structure according to one embodiment of the present specification has small variations in the wavelength-dependent light transmittance, and particularly, variations in the light transmittance are small in a wavelength range of 380 nm to 450 nm. In addition, the conductive structure according to one embodiment of the present specification is capable of obtaining high light transmittance in a wide wavelength range.

DESCRIPTION OF DRAWINGS

FIG. 1 shows a laminated structure of a conductive structure according to one embodiment of the present specification.

FIG. 2 represents wavelength-dependent light transmittance of a conductive structure according to examples and comparative examples.

101: First Hafnium Oxide Layer
201: Metal Layer
301: Second Hafnium Oxide Layer

MODE FOR DISCLOSURE

Hereinafter, the present specification will be described in more detail.

In the present specification, a description of one member being placed "on" another member includes not only a case of the one member adjoining the another member but a case of still another member being present between the two members.

In the present specification, a description of a certain part "including" certain constituents means capable of further including other constituents, and does not exclude other constituents unless particularly stated on the contrary.

One embodiment of the present specification provides a conductive structure including a first hafnium oxide layer including a hafnium oxide; a metal layer provided on the first hafnium oxide layer; and a second hafnium oxide layer including a hafnium oxide provided on the metal layer, wherein the following Mathematical Formula 1 is satisfied.

$$\frac{0.12}{D_{eff}} + \left(1 - 0.06^{k_{eff\_dielectric}}\right) + \left(1 - 0.98^{(d \cdot k_{eff\_metal})}\right) \leq 0.25$$ [Mathematical Formula 1]

$$D_{eff} = \frac{n_{eff\_550} - 1}{n_{eff\_380} - n_{eff\_450}}$$ [Mathematical Formula 2]

$$n^2_{eff\_dielectric} = \frac{1}{2}\{(n_1^2 - k_1^2)f_1 + (n_2^2 - k_2^2)f_2\} \times \left(1 + \left\{1 + \left[\frac{2(n_1 k_1 f_1 + n_2 k_2 f_2)}{(n_1^2 - k_1^2)f_1 + (n_2^2 - k_2^2)f_2}\right]^2\right\}^{1/2}\right)$$ [Mathematical Formula 3]

$$k_{eff\_dielectric} = \frac{1}{n_{eff\_dielectric}}(n_1 k_1 f_1 + n_2 k_2 f_2)$$ [Mathematical Formula 4]

-continued $$n^2_{eff\_metal} = \frac{1}{2}\{(n_3^2 - k_3^2)f_3 + (n_4^2 - k_4^2)f_4\} \times \left(1 + \left\{1 + \left[\frac{2(n_3 k_3 f_3 + n_4 k_4 f_4)}{(n_3^2 - k_3^2)f_3 + (n_4^2 - k_4^2)f_4}\right]^2\right\}^{1/2}\right)$$ [Mathematical Formula 5]

$$k_{eff\_metal} = \frac{1}{n_{eff\_metal}}(n_3 k_3 f_3 + n_4 k_4 f_4)$$ [Mathematical Formula 6]

In Mathematical Formula 1, $D_{eff}$ is a degree of dispersion of a mean refractive index of the first hafnium oxide layer and the second hafnium oxide layer calculated by Mathematical Formulae 2 and 3, $k_{eff\_dielectric}$ is a mean extinction coefficient of the first hafnium oxide layer and the second hafnium oxide layer calculated by Mathematical Formula 4, d is a total thickness of the first hafnium oxide layer, the second hafnium oxide layer and the metal layer, and $k_{eff\_metal}$ is a mean extinction coefficient of the first hafnium oxide layer, the second hafnium oxide layer and the metal layer calculated by Mathematical Formula 5, in Mathematical Formula 2, $n_{eff\_550}$ is a mean refractive index of the first hafnium oxide layer and the second hafnium oxide layer calculated by Mathematical Formula 3 in light with a wavelength of 550 nm, $n_{eff\_450}$ is a mean refractive index of the first hafnium oxide layer and the second hafnium oxide layer calculated by Mathematical Formula 3 in light with a wavelength of 450 nm, and $n_{eff\_380}$ is a mean refractive index of the first hafnium oxide layer and the second hafnium oxide layer calculated by Mathematical Formula 3 in light with a wavelength of 380 nm, in Mathematical Formulae 3 and 4, $n_1$ is a refractive index of the first hafnium oxide layer, $n_2$ is a refractive index of the second hafnium oxide layer, $k_1$ is an extinction coefficient of the first hafnium oxide layer, $k_2$ is an extinction coefficient of the second hafnium oxide layer, $f_1$ is a thickness ratio of the first hafnium oxide layer with respect to the first hafnium oxide layer and the second hafnium oxide layer, and $f_2$ is a thickness ratio of the second hafnium oxide layer with respect to the first hafnium oxide layer and the second hafnium oxide layer, in Mathematical Formulae 5 and 6, $n_3$ is a mean refractive index ($n_{eff\_dielectric}$) of the first hafnium oxide layer and the second hafnium oxide layer, $n_4$ is a refractive index of the metal layer, $k_3$ is a mean extinction coefficient ($k_{eff\_dielectric}$) of the first hafnium oxide layer and the second hafnium oxide layer, $k_4$ is an extinction coefficient of the metal layer, $f_3$ is a thickness ratio of the first hafnium oxide layer and the second hafnium oxide layer with respect to the conductive structure, and $f_4$ is a thickness ratio of the metal layer with respect to the conductive structure, and the mean extinction coefficient ($k_{eff\_dielectric}$) of the first hafnium oxide layer and the second hafnium oxide layer, and the mean extinction coefficient ($k_{eff\_metal}$) of the first hafnium oxide layer, the second hafnium oxide layer and the metal layer are values each measured in light with a wavelength of 380 nm.

According to one embodiment of the present specification, Mathematical Formula 1 means a parameter for preparing a conductive structure capable of securing high light transmittance, and minimizing changes in the light transmittance in a short wavelength visible region. Specifically, factors affecting transmittance and changes in the transmittance of the conductive structure are a degree of dispersion of a refractive index of the dielectric layer, a light absorption amount of the dielectric layer, and a light absorption amount of the metal layer, and Mathematical Formula 1 means a relation formula capable of obtaining an optimal range of such affecting factors.

According to one embodiment of the present specification, the refractive index and the extinction coefficient of each layer according to Mathematical Formulae 1 to 6 may be measured through an ellipsometer.

According to one embodiment of the present specification, the first hafnium oxide layer and the second hafnium oxide layer may be layers each including a hafnium oxide in 70 wt % or greater, or 85 wt % or greater. In addition, according to one embodiment of the present specification, the first hafnium oxide layer and the second hafnium oxide layer may be layers each including a hafnium oxide in 95 wt % or greater. Furthermore, according to one embodiment of the present specification, the first hafnium oxide layer and the second hafnium oxide layer may be layers each formed with a hafnium oxide.

In general conductive structure bodies, variations in the light transmittance are very large in a 380 nm to 450 nm wavelength region causing a problem of increasing a difference in the light transmittance depending on the wavelength range. In view of the above, the inventors of the present disclosure have found out conditions of a conductive structure capable of minimizing variations in the light transmittance in a 380 nm to 450 nm wavelength region.

According to one embodiment of the present specification, when the value of Mathematical Formula 1 is 0.25 or less, the conductive structure has an advantage of having small variations in the light transmittance in a 380 nm to 450 nm wavelength region. Specifically, when the value of Mathematical Formula 1 is 0.25 or less, the conductive structure has small variations in the light transmittance in a 380 nm to 450 nm wavelength region, and therefore, more superior transparency may be obtained in a wide wavelength range, and high visibility may be secured.

According to one embodiment of the present specification, material-dependent optical properties of each constituent of the conductive structure may be considered in the use in order for Mathematical Formula 1 to satisfy a value of 0.25 or less.

A refractive index n is n≈1/T when an incidence angle of light is 0° and incidence occurs in the air, and therefore, changes in the transmittance caused by a difference in the refractive index may be represented by a reaction formula of light transmittance and $D_{\text{eff}}$, a degree of dispersion of a refractive index.

According to one embodiment of the present specification, the coefficient of 0.12 in Mathematical Formula 1 is an experimentally obtained coefficient, and is a value calculated using light transmittance at 380 nm, light transmittance at 450 nm and light transmittance at 550 nm of the conductive structure. Specifically, according to one embodiment of the present specification, the coefficient of 0.12 in Mathematical Formula 1 may be experimentally calculated through the following Mathematical Formula 7.

$$\frac{(1 - T_{550})T_{380}T_{450}}{T_{550}} \quad \text{[Mathematical Formula 7]}$$

In Mathematical Formula 7, $T_{550}$ is light transmittance of the conductive structure in light with a wavelength of 550 nm, $T_{450}$ is light transmittance of the conductive structure in light with a wavelength of 450 nm, and $T_{380}$ is light transmittance of the conductive structure in light with a wavelength of 380 nm. Specifically, the wavelength of 380 nm is a lowest wavelength in a visible region, the wavelength of 450 nm is a point at which changes in the visible transmittance is saturated in the conductive structure, and the wavelength of 550 nm is a wavelength best recognized to the human eye among visible rays, and as a result of calculating an optimal value through Mathematical Formula 7, a conductive structure having excellent properties is capable of being manufactured when the value is 0.12.

According to one embodiment of the present specification, the coefficient of 0.12 may be established when changes in the light transmittance of the conductive structure are 30% or less at wavelengths of 380 nm to 450 nm, and mean light transmittance is 70% or greater.

According to one embodiment of the present specification, changes in the light transmittance caused by light absorption of each layer of the conductive laminate may be expressed using an extinction coefficient. Specifically, an absorption amount by the extinction coefficient of each layer may be expressed as the following formula.

$$e^{-\frac{4\pi k_{\text{eff}}}{\lambda} \cdot d}$$

In the formula, λ means a wavelength of light, $k_{\text{eff}}$ is an extinction coefficient of the corresponding layer, d means a thickness of the corresponding layer. Changes in the transmittance are induced by light absorption of each layer of the conductive laminate, and the light absorption amount of the each layer may be determined by the extinction coefficient as in the above formula.

According to one embodiment of the present specification, the coefficient of 0.06 in Mathematical Formula 1 is a value capable of optimizing performance of the conductive structure when a thickness sum of the first hafnium oxide layer and the second hafnium oxide layer is greater than or equal to 40 nm and less than or equal to 120 nm.

According to one embodiment of the present specification, the coefficient of 0.98 in Mathematical Formula 1 is a value capable of optimizing performance of the conductive structure when a thickness sum of the first hafnium oxide layer and the second hafnium oxide layer is greater than or equal to 40 nm and less than or equal to 120 nm, and a thickness of the metal layer is greater than or equal to 5 nm and less than or equal to 20 nm.

According to one embodiment of the present specification, the degree of dispersion ($D_{\text{eff}}$) of the mean refractive index of the first hafnium oxide layer and the second hafnium oxide layer may be 1.1 or greater. Specifically, according to one embodiment of the present specification, the degree of dispersion ($D_{\text{eff}}$) of the mean refractive index of the first hafnium oxide layer and the second hafnium oxide layer may be 10 or greater, or 20 or greater.

When the degree of dispersion ($D_{\text{eff}}$) of the mean refractive index of the first hafnium oxide layer and the second hafnium oxide layer is 1.1 or less, the value of Mathematical Formula 1 is greater than 0.25, and variations in the light transmittance may increase at low wavelengths.

According to one embodiment of the present specification, the mean extinction coefficient ($k_{\text{eff\_dielectric}}$) of the first hafnium oxide layer and the second hafnium oxide layer may be 0.1 or less. Specifically, according to one embodiment of the present specification, the mean extinction coefficient ($k_{\text{eff\_dielectric}}$) of the first hafnium oxide layer and the second hafnium oxide layer may be 0.04 or less.

According to one embodiment of the present specification, the mean extinction coefficient ($k_{\mathit{eff\_metal}}$) of the first hafnium oxide layer, the second hafnium oxide layer and the metal layer may be 0.22 or less. Specifically, according to one embodiment of the present specification, the mean extinction coefficient ($k_{\mathit{eff\_metal}}$) of the first hafnium oxide layer, the second hafnium oxide layer and the metal layer may be 0.1 or less.

FIG. 1 shows a laminated structure of a conductive structure according to one embodiment of the present specification. Specifically, FIG. 1 shows a conductive structure consecutively provided with a first hafnium oxide layer (101); a metal layer (201); and a second hafnium oxide layer (301).

According to one embodiment of the present specification, the first hafnium oxide layer and the second hafnium oxide layer may have a total thickness of greater than or equal to 40 nm and less than or equal to 120 nm. Specifically, according to one embodiment of the present specification, the first hafnium oxide layer and the second hafnium oxide layer may have a total thickness of greater than or equal to 40 nm and less than or equal to 110 nm.

The first hafnium oxide layer is a high refractive material, and may perform a role of increasing light transmittance of a multilayer conductive structure using a metal layer, and perform a role of facilitating deposition of the metal layer.

According to one embodiment of the present specification, the first hafnium oxide layer may have a thickness of greater than or equal to 20 nm and less than or equal to 70 nm. Specifically, according to one embodiment of the present specification, the first hafnium oxide layer may have a thickness of greater than or equal to 20 nm and less than or equal to 60 nm, or greater than or equal to 25 nm and less than or equal to 55 nm.

The first hafnium oxide layer having a thickness in the above-mentioned range has an advantage in that the conductive structure having a multilayer thin film form has excellent transmittance. Specifically, the first hafnium oxide layer having a thickness outside the above-mentioned range causes a problem of reducing transmittance of the conductive structure. In addition, when the thickness is outside the above-mentioned range, a fraction defective of the deposited metal layer may increase.

According to one embodiment of the present specification, the second hafnium oxide layer may have a thickness of greater than or equal to 20 nm and less than or equal to 80 nm. Specifically, according to one embodiment of the present specification, the second hafnium oxide layer may have a thickness of greater than or equal to 20 nm and less than or equal to 60 nm, or greater than or equal to 25 nm and less than or equal to 55 nm.

The second hafnium oxide layer having a thickness in the above-mentioned range has an advantage in that the conductive structure may have excellent electrical conductivity and low resistance values. Specifically, the thickness range of the second hafnium oxide layer is obtained through an optical design, and the thickness being outside the above-mentioned range causes a problem of reducing light transmittance of the conductive structure.

According to one embodiment of the present specification, the metal layer may have a thickness of greater than or equal to 5 nm and less than or equal to 25 nm. Specifically, in the conductive structure according to one embodiment of the present specification, the metal layer may have a thickness of greater than or equal to 7 nm and less than or equal to 20 nm.

The metal layer having a thickness in the above-mentioned range has an advantage in that the conductive structure may have excellent electrical conductivity and low resistance values. Specifically, when the metal layer has a thickness of less than 5 nm, a continuous film is difficult to form leading to a problem of low resistance being difficult to obtain, and the thickness being greater than 20 nm has a problem of reducing transmittance of the conductive structure.

According to one embodiment of the present specification, the metal layer may include one or more metals selected from the group consisting of Ag, Pt, Al, Ni, Ti, Cu, Pd, P, Zn, Si, Sn, Cd, Ga, Mn and Co. Specifically, according to one embodiment of the present specification, the metal layer may include one or more types of metals selected from the group consisting of Ag, Pt and Al. More specifically, according to one embodiment of the present specification, the metal layer may include Ag.

In addition, according to one embodiment of the present specification, the metal layer may be formed with Ag, or Ag and Ag oxides. Specifically, the metal layer may be formed only with Ag. In addition, Ag oxides may be partly included in the metal layer through a contact with air and moisture during a manufacturing process of the conductive structure or while the conductive structure is included and used in an electronic device.

According to one embodiment of the present specification, when the metal layer is formed with Ag and Ag oxides, the Ag oxides may be greater than or equal to 0.1 wt % and less than or equal to 50 wt % of the metal layer weight.

The metal layer may perform a role of obtaining low resistance of the conductive structure by excellent electrical conductivity and low specific resistance.

According to one embodiment of the present specification, the metal layer may have a refractive index of greater than or equal to 0.1 and less than or equal to 1 in light with a wavelength of 550 nm. Specifically, according to one embodiment of the present specification, the metal layer may have a refractive index of greater than or equal to 0.1 and less than or equal to 0.5 in light with a wavelength of 550 nm.

According to one embodiment of the present specification, the first hafnium oxide layer and the second hafnium oxide layer may each further include a dopant selected from the group consisting of Nb, Zr, Y, Ta, La, V, Ti, Zn, B, Si, Al, In and Sn.

According to one embodiment of the present specification, the dopant content may be greater than or equal to 0.1 wt % and less than or equal to 20 wt % with respect to the hafnium oxide layer.

When the dopant is included in the above-mentioned range in each of the hafnium oxide layers, optical properties and environmental resistance of the conductive structure may be enhanced.

According to one embodiment of the present specification, the conductive structure may further include a transparent support, and on the transparent support, the first hafnium oxide layer may be provided.

According to one embodiment of the present specification, the transparent support may be a glass substrate or a transparent plastic substrate having excellent transparency, surface smoothness, handling readiness and water resistance, but is not limited thereto, and is not limited as long as it is a substrate commonly used in an electronic device. Specifically, the substrate may be formed with glass; urethane resins; polyimide resins; polyester resins; (meth)acrylate-based polymer resins; polyolefin-based resins such as polyethylene or polypropylene.

According to one embodiment of the present specification, the conductive structure may have mean light transmittance of 70% or greater in light with a wavelength of 550 nm. Specifically, according to one embodiment of the present specification, the conductive structure may have mean light transmittance of 75% or greater, or 80% or greater in light with a wavelength of 550 nm.

According to one embodiment of the present specification, variations in the light transmittance of the conductive structure may be 40% or less in a 380 nm to 450 nm wavelength region. Specifically, according to one embodiment of the present specification, variations in the light transmittance of the conductive structure may be 30% or less in a 380 nm to 450 nm wavelength region.

According to one embodiment of the present specification, the conductive structure may have a sheet resistance value of 20 Ω/sq or less. Specifically, according to one embodiment of the present specification, the conductive structure may have a sheet resistance value of 10 Ω/sq or less.

According to one embodiment of the present specification, the conductive structure may have a sheet resistance value of greater than or equal to 0.1 Ω/sq and less than or equal to 20 ΩQ/sq. The sheet resistance value of the conductive structure may be determined by the metal layer, and a low sheet resistance value may be obtained by the thickness range of the metal layer and the thickness range of the second hafnium oxide layer including a second metal oxide.

The conductive structure has an advantage of enhancing electronic device efficiency when used in an electronic device due to a low sheet resistance value. Furthermore, the conductive structure has an advantage of having high light transmittance despite a low sheet resistance value.

According to one embodiment of the present specification, the conductive structure may have a total thickness of greater than or equal to 50 nm and less than or equal to 300 nm.

One embodiment of the present specification provides a transparent electrode including the conductive structure.

One embodiment of the present specification provides an electronic device including the conductive structure. According to one embodiment of the present specification, the conductive structure included in the electronic device may perform a role of a transparent electrode.

According to one embodiment of the present specification, the electronic device may be a touch panel, a light emitting glass, a light emitting device, a solar cell or a transistor.

The touch panel, the light emitting glass, the light emitting device, the solar cell and the transistor may be those generally known in the art, and may use the conductive structure of the present specification as an electrode.

[Best Mode]

Hereinafter, the present specification will be described in detail with reference to examples. However, the examples according to the present specification may be modified to various other forms, and the scope of the present specification is not construed as being limited to the examples described below. The examples of the present specification are provided in order to more completely describe the present specification to those having average knowledge in the art.

Example 1

A first hafnium oxide layer was formed by depositing a Hf oxide to 40 nm on a glass substrate using a RF sputter method. A metal layer formed with Ag was deposited to 10 nm on the first hafnium oxide layer using a DC sputter method, and a second hafnium oxide layer was formed by depositing a Hf oxide to 40 nm on the metal layer to manufacture a conductive structure.

Example 2

A first hafnium oxide layer was formed by depositing a Hf oxide to 40 nm on a glass substrate using a RF sputter method. A metal layer formed with Ag was deposited to 13 nm on the first hafnium oxide layer using a DC sputter method, and a second hafnium oxide layer was formed by depositing a Hf oxide to 40 nm on the metal layer to manufacture a conductive structure.

Example 3

A first hafnium oxide layer was formed by depositing a Hf oxide to 40 nm on a glass substrate using a DC sputter method while introducing oxygen. A metal layer formed with Ag was deposited to 13 nm on the first hafnium oxide layer using a DC sputter method, and a second hafnium oxide layer was formed by depositing a Hf oxide to 40 nm on the metal layer to manufacture a conductive structure.

Comparative Example 1

ITO was deposited to 40 nm on a glass substrate using a DC sputter method, a metal layer formed with Ag was deposited to 13 nm on the ITO using a DC sputter method, and ITO was deposited to 40 nm on the metal layer to manufacture a conductive structure.

The ITO layer of Comparative Example 1 was prepared in a constitution corresponding to the hafnium oxide layer of the examples.

Comparative Example 2

A first hafnium oxide layer was formed by depositing a Hf oxide to 70 nm on a glass substrate using a RF sputter method. A metal layer formed with Ag was deposited to 30 nm on the first hafnium oxide layer using a DC sputter method, and a second hafnium oxide layer was formed by depositing a Hf oxide to 80 nm on the metal layer to manufacture a conductive structure.

Values of Mathematical Formula 1 and properties depending on each constitution of the conductive structure bodies according to the examples and the comparative examples are shown in the following Table 1.

TABLE 1

| | Parameter | | | | Refractive Index | |
| --- | --- | --- | --- | --- | --- | --- |
| | Mathematical Formula 1 | $D_{eff}$ | $K_{eff\_dielectric}$ | $K_{eff\_metal}$ | First Hafnium Oxide Layer | Second Hafnium Oxide Layer |
| Example 1 | 0.06 | 21.9 | 0 | 0.03 | 2.09 | 2.09 |
| Example 2 | 0.08 | 21.9 | 0 | 0.04 | 2.09 | 2.09 |
| Example 3 | 0.13 | 27.2 | 0.009 | 0.04 | 2.10 | 2.10 |
| Comparative Example 1 | 0.50 | 7.46 | 0.110 | 0.13 | 2.06 | 2.06 |
| Comparative Example 2 | 0.27 | 21.9 | 0 | 0.08 | 2.09 | 2.09 |

TABLE 1-continued

|  | Thickness | | | Tr (%) @550 nm | ΔTr (%) (@380 nm-450 nm) | Sheet Resistance (Ω/sq) |
| --- | --- | --- | --- | --- | --- | --- |
|  | First Hafnium Oxide Layer | Metal Layer | Second Hafnium Oxide Layer | | | |
| Example 1 | 40 | 10 | 40 | 89.8 | 3.42 | <10 |
| Example 2 | 40 | 13 | 40 | 90.1 | 9.01 | <10 |
| Example 3 | 40 | 13 | 40 | 87.7 | 8.08 | <10 |
| Comparative Example 1 | 46 | 10 | 46 | 87.9 | 34.1 | <10 |
| Comparative Example 2 | 70 | 30 | 80 | 22.3 | −4.6 | <5 |

In addition, FIG. 2 shows wavelength-dependent light transmittance of the conductive structure bodies according to the examples and the comparative examples.

According to Table 1 and FIG. 2, it was seen that, in the conductive structure bodies according to the comparative examples that did not satisfy Mathematical Formula 1, variations in the light transmittance were very large in a 380 nm to 450 nm wavelength range. Meanwhile, in Examples 1 to 3 satisfying Mathematical Formula 1, it was seen that variations in the light transmittance were relatively small in a 380 nm to 450 nm wavelength range.

The invention claimed is:

1. A conductive structure comprising:
a first hafnium oxide layer including a hafnium oxide;
a metal layer provided on the first hafnium oxide layer; and
a second hafnium oxide layer including a hafnium oxide provided on the metal layer,
wherein the second hafnium oxide layer further includes a dopant selected from the group consisting of Nb, Zr, Ta, La, V, Zn, B, Si, Al, In and Sn,
wherein the conductive structure has mean light transmittance of 80% or greater for light with a wavelength of 550 nm, and
wherein the conductive structure satisfies Mathematical Formulas 1-6:

$$\frac{0.12}{D_{eff}} + \left(1 - 0.06^{k_{eff\_dielectric}}\right) + \left(1 - 0.98^{(d \cdot k_{eff\_metal})}\right) \leq 0.25 \quad \text{[Mathematical Formula 1]}$$

$$D_{eff} = \frac{n_{eff\_550} - 1}{n_{eff\_380} - n_{eff\_450}} \quad \text{[Mathematical Formula 2]}$$

$$n^2_{eff\_dielectric} = \frac{1}{2}\{(n_1^2 - k_1^2)f_1 + (n_2^2 - k_2^2)f_2\} \times \left(1 + \left\{1 + \left[\frac{2(n_1 k_1 f_1 + n_2 k_2 f_2)}{(n_1^2 - k_1^2)f_1 + (n_2^2 - k_2^2)f_2}\right]^2\right\}^{1/2}\right) \quad \text{[Mathematical Formula 3]}$$

$$k_{eff\_dielectric} = \frac{1}{n_{eff\_dielectric}}(n_1 k_1 f_1 + n_2 k_2 f_2) \quad \text{[Mathematical Formula 4]}$$

$$n^2_{eff\_metal} = \frac{1}{2}\{(n_3^2 - k_3^2)f_3 + (n_4^2 - k_4^2)f_4\} \times \left(1 + \left\{1 + \left[\frac{2(n_3 k_3 f_3 + n_4 k_4 f_4)}{(n_3^2 - k_3^2)f_3 + (n_4^2 - k_4^2)f_4}\right]^2\right\}^{1/2}\right) \quad \text{[Mathematical Formula 5]}$$

$$k_{eff\_metal} = \frac{1}{n_{eff\_metal}}(n_3 k_3 f_3 + n_4 k_4 f_4) \quad \text{[Mathematical Formula 6]}$$

wherein, in Mathematical Formula 1, $D_{eff}$ is a degree of dispersion of a mean refractive index of the first hafnium oxide layer and the second hafnium oxide layer calculated by Mathematical Formulae 2 and 3, $k_{eff\_dielectric}$ is a mean extinction coefficient of the first hafnium oxide layer and the second hafnium oxide layer calculated by Mathematical Formula 4, d is a total thickness of the first hafnium oxide layer, the second hafnium oxide layer and the metal layer, and $k_{eff\_metal}$ is a mean extinction coefficient of the first hafnium oxide layer, the second hafnium oxide layer and the metal layer calculated by Mathematical Formula 5;

in Mathematical Formula 2, $n_{eff\_550}$ is a mean refractive index of the first hafnium oxide layer and the second hafnium oxide layer calculated by Mathematical Formula 3 for light with a wavelength of 550 nm, $n_{eff\_450}$ is a mean refractive index of the first hafnium oxide layer and the second hafnium oxide layer calculated by Mathematical Formula 3 in light with a wavelength of 450 nm, and $n_{eff\_380}$ is a mean refractive index of the first hafnium oxide layer and the second hafnium oxide layer calculated by Mathematical Formula 3 for light with a wavelength of 380 nm;

in Mathematical Formulae 3 and 4, $n_1$ is a refractive index of the first hafnium oxide layer, $n_2$ is a refractive index of the second hafnium oxide layer, $k_1$ is an extinction coefficient of the first hafnium oxide layer, $k_2$ is an extinction coefficient of the second hafnium oxide layer, $f_1$ is a thickness ratio of the first hafnium oxide layer with respect to the first hafnium oxide layer and the second hafnium oxide layer, and $f_2$ is a thickness ratio of the second hafnium oxide layer with respect to the first hafnium oxide layer and the second hafnium oxide layer;

in Mathematical Formulae 5 and 6, $n_3$ is a mean refractive index ($n_{eff\_dielectric}$) of the first hafnium oxide layer and the second hafnium oxide layer, $n_4$ is a refractive index of the metal layer, $k_3$ is a mean extinction coefficient ($k_{eff\_dielectric}$) of the first hafnium oxide layer and the second hafnium oxide layer, $k_4$ is an extinction coefficient of the metal layer, $f_3$ is a thickness ratio of the first hafnium oxide layer and the second hafnium oxide layer with respect to the conductive structure, and $f_4$ is a thickness ratio of the metal layer with respect to the conductive structure; and the mean extinction coefficient ($k_{eff\_dielectric}$) of the first hafnium oxide layer and the second hafnium oxide layer, and the mean extinction coefficient ($k_{eff\_metal}$) of the first hafnium oxide layer, the second hafnium oxide layer and the metal layer are values each measured for light with a wavelength of 380 nm.

2. The conductive structure of claim 1, wherein the degree of dispersion of the mean refractive index ($D_{eff}$) of the first hafnium oxide layer and the second hafnium oxide layer is 1.1 or greater.

3. The conductive structure of claim 1, wherein the mean extinction coefficient ($k_{eff\_dielectric}$) of the first hafnium oxide layer and the second hafnium oxide layer is 0.1 or less.

4. The conductive structure of claim 1, wherein the mean extinction coefficient ($k_{\mathit{eff\_metal}}$) of the first hafnium oxide layer, the second hafnium oxide layer and the metal layer is 0.22 or less.

5. The conductive structure of claim 1, wherein the first hafnium oxide layer and the second hafnium oxide layer has a total thickness of greater than or equal to 40 nm and less than or equal to 120 nm.

6. The conductive structure of claim 1, wherein the first hafnium oxide layer further includes a dopant selected from the group consisting of Nb, Zr, Y, Ta, La, V, Ti, Zn, B, Si, Al, In and Sn.

7. The conductive structure of claim 6, wherein a content of the dopant in each of the first hafnium oxide layer and the second hafnium oxide layer is greater than or equal to 0.1 wt % and less than or equal to 20 wt % with respect to the hafnium oxide layer.

8. The conductive structure of claim 1, wherein the metal layer has a thickness of greater than or equal to 5 nm and less than or equal to 25 nm.

9. The conductive structure of claim 1, wherein the metal layer has a refractive index of greater than or equal to 0.1 and less than or equal to 1 in light with a wavelength of 550 nm.

10. The conductive structure of claim 1, wherein the conductive structure further includes a transparent support, and the first hafnium oxide layer is provided on the transparent support.

11. The conductive structure of claim 1, wherein variations in the light transmittance of the conductive structure are 40% or less for light having a wavelength in the 380 nm to 450 nm wavelength region.

12. The conductive structure of claim 1, which has a sheet resistance value of 20 Ω/sq or less.

13. A transparent electrode comprising the conductive structure of claim 1.

14. An electronic device comprising the conductive structure of claim 1.

* * * * *